United States Patent
Wernet et al.

(10) Patent No.: US 9,146,145 B2
(45) Date of Patent: Sep. 29, 2015

(54) APPARATUS FOR DETERMINING AND/OR MONITORING A PROCESS VARIABLE

(75) Inventors: Armin Wernet, Rheinfelden (DE); Roland Dieterle, Lörrach (DE); Kaj Uppenkamp, Wehr (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 1799 days.

(21) Appl. No.: 12/311,211

(22) PCT Filed: Oct. 2, 2007

(86) PCT No.: PCT/EP2007/060483
§ 371 (c)(1),
(2), (4) Date: Sep. 17, 2009

(87) PCT Pub. No.: WO2008/040746
PCT Pub. Date: Apr. 10, 2008

(65) Prior Publication Data
US 2010/0005880 A1    Jan. 14, 2010

(30) Foreign Application Priority Data
Oct. 6, 2006 (DE) .......................... 10 2006 047 780

(51) Int. Cl.
*G01F 23/24* (2006.01)
*G01F 23/26* (2006.01)

(52) U.S. Cl.
CPC ................ *G01F 23/24* (2013.01); *G01F 23/26* (2013.01)

(58) Field of Classification Search
USPC ........................................................ 73/304 R
See application file for complete search history.

(56) References Cited

U.S. PATENT DOCUMENTS 3,706,980 A * 12/1972 Maltby .......................... 340/507

FOREIGN PATENT DOCUMENTS

| DE | 32 12 434 A1 | 10/1983 |
| EP | 0 167 257 A1 | 1/1986 |
| EP | 0 766 398 A1 | 4/1997 |
| EP | 0 977 363 A2 | 2/2000 |

* cited by examiner

*Primary Examiner* — Hezron E Williams
*Assistant Examiner* — Tarun Sinha
(74) *Attorney, Agent, or Firm* — Bacon & Thomas, PLLC

(57) ABSTRACT

An apparatus for determining and/or monitoring a process variable of a medium in a container. including: a probe unit, which has a sensor electrode and a guard electrode; and an electronics unit, which supplies the sensor electrode with an activating signal and which supplies the guard electrode with a guard signal; An amplifying unit; and a limiting element arranged in series between the guard electrode and the output of the amplifying unit. The amplifying unit supplies via the limiting element the guard electrode with the guard signal; and the amplifying unit supplies via the limiting element the sensor electrode with the activating signal. The evaluating unit is provided, which determines and/or monitors the process variable based on an electrical current signal measurable at the sensor electrode, and the activating signal and/or the guard signal.

13 Claims, 3 Drawing Sheets

APPARATUS FOR DETERMINING AND/OR MONITORING A PROCESS VARIABLE

TECHNICAL FIELD

The invention relates to an apparatus for determining and/or monitoring at least one process variable of a medium in a container. The apparatus includes: at least one probe unit, which includes at least one sensor electrode and a guard electrode; and at least one electronics unit, which supplies the sensor electrode with an activating signal and which supplies the guard electrode with a guard signal. The process variable is, for example, fill-level.

BACKGROUND DISCUSSION

In the state of the art, it is known to monitor fill-level of a medium by detecting whether the conductive medium is providing electrical contact between a probe electrode and the wall of a conductive container or a second electrode. Since, in the case of many media, an accretion can form on the probe unit, so-called guard electrodes are used, which lie at the same electrical potential as the probe electrode and surround the probe electrode (see e.g. DE 32 12 434 C2). Depending on the character of the accretion, it is, however, possible, that there will be difficulties with suitably producing the guard signal.

SUMMARY OF THE INVENTION

Thus, an object of the invention is to provide a measuring device exhibiting insensitivity to accretion over a large range.

The invention achieves the object by the provision of: at least one amplifying unit; at least one limiting element, which is arranged in series between the guard electrode and the output of the amplifying unit, wherein the amplifying unit supplies via the limiting element the guard electrode with the guard signal, and wherein the amplifying unit supplies via the limiting element the sensor electrode with the activating signal; and at least one evaluating unit, which determines and/or monitors the process variable based on an electrical current signal measured at the sensor electrode and the activating signal and/or the guard signal. The amplifying unit, which produces the guard signal, is limited, according to the invention, by a limiting element, which is, for example, however, not necessarily, an ohmic resistor. This effects, for example, that there can be no saturation effect. This signal, limited in such a manner in its amplitude, is then supplied to the probe electrode as exciter signal. At the probe electrode, an electrical current signal is then measured, which, in connection with the activating signal or the guard signal, is evaluated with respect to the process variable. In such case, a conductive or a capacitive evaluation is possible, wherein, on occasion, also the phase between the two signals is used. In an embodiment, the activating signal is identical with the guard signal. Furthermore, it is advantageous, for application of the guard, to have the guard electrode surround the sensor electrode at the location where the accretion can form. In an embodiment, it is, therefore, provided, that the guard electrode coaxially surrounds the sensor electrode in the region of the probe unit facing the medium.

One embodiment provides that the amplification factor of the amplifying unit has a value essentially constant with respect to time. In this embodiment, the amplification is set equal to one.

Another embodiment includes, that at least one measuring resistor is provided, where the electrical current signal is measured.

Another embodiment provides, that at least one isolating unit is provided, whose input is electrically connected with the limiting element and whose output is electrically connected with the sensor electrode, wherein the isolating unit is embodied in such a manner, that the isolating unit essentially prevents effects of an electrical circuit, which is connected with the output of the isolating unit, from reaching an electrical circuit connected with the input of the isolating unit. The electronics unit can be thought of functionally as divided into at least two circuits or circuit portions. On the one hand, there is the part associated with the guard electrode and, on the other hand, the part associated with the sensor electrode. As is already described above, essentially first the guard section is supplied with the guard signal and then the sensor section receives the same signal. The isolating unit assures that the circuit portion with the sensor electrode has no effects on the guard electrode circuit portion, i.e. freedom from interaction is provided.

Another embodiment includes, that the isolating unit is an amplifying unit. In this embodiment, the amplification factor of such amplifier is set equal to one.

Another embodiment provides, that at least one probe electrical current limiting element is provided, which is arranged between the output of the isolating unit and the sensor electrode and which limits the electrical current flowing via the sensor electrode.

Another embodiment includes, that the container is embodied at least partially as a ground electrode. Alternatively, a second electrode is provided as counter-electrode, which is either introduced supplementally into the container or which is a part of the probe unit.

Another embodiment provides that the limiting element is an ohmic resistor, and/or that the probe electrical current limiting element is an ohmic resistor.

Another embodiment includes, that at least one signal source is provided, which is connected with the input of the first amplifying unit.

Another embodiment provides that the guard signal and the activating signal are electrical, alternating voltages.

Another embodiment includes, that the evaluating unit is embodied in such a manner, that the evaluating unit digitizes at least the guard signal and/or the activating signal. This digitizing enables determining, for example, the phase between the activating signal or the guard signal and the electrical current signal or a voltage signal proportional to the electrical current signal. Furthermore, signal processing is then markedly simpler.

Another embodiment provides, that the evaluating unit is embodied in such a manner, that the evaluating unit ascertains at least an amplitude ratio of the guard signal and/or the activating signal and the electrical current signal and/or an electrical voltage signal dependent therefrom, and that the evaluating unit determines and/or monitors the process variable on the basis of the amplitude ratio.

Another embodiment includes, that the process variable is the fill-level of the medium.

BRIEF DESCRIPTION OF THE DRAWINGS

The invention will now be explained in greater detail on the basis of the appended drawing, the figures of which show as follows.

DETAILED DISCUSSION

Figure 1:
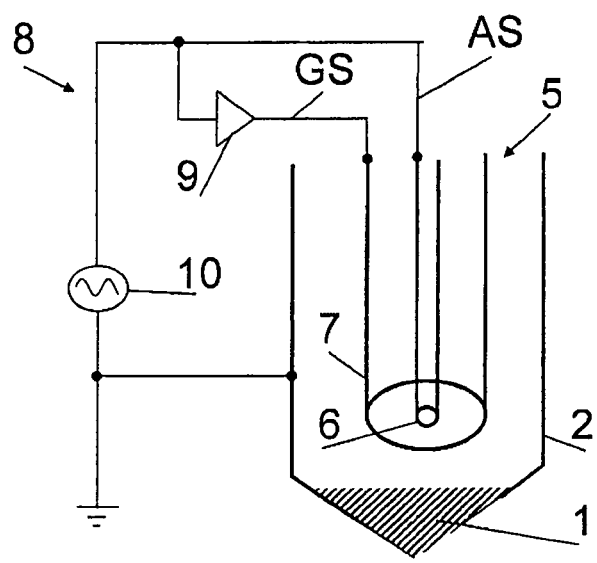
FIG. 1 a schematic drawing of a measuring device according to the state of the art.

FIG. 1 shows monitoring fill-level of a medium 1 within a container 2. Medium 1 is, in such case, preferably, an electrically conductive liquid. Application in the case of electrically non-conductive media is likewise possible. The measuring device is composed of an electronics unit 8 and a probe unit 5. In a practical embodiment, the probe unit 5 is preferably installed in such a manner in the wall of the container 2, that the wall and the probe unit are coterminous, so that, thus, the probe 5 does not protrude inwardly into the container 2. This structure is preferably also provided for the measuring device of the invention shown by way of example in FIG. 2. Container 2 can be, for example, also a tube, through which the medium 1 flows—thus, the term "container" refers to any kind of structural means which, at least at times, receives a medium. The wall of the container 2 is, here, embodied as a ground electrode, i.e. it is electrically conductively connected with ground potential. Alternatively, a second electrode is introduced into the container 2. Likewise connected with ground is a signal source 10, which especially produces an electrical, alternating voltage signal as activating signal AS. This signal AS is supplied to the sensor electrode 6. If the electrically conductive medium 1 reaches a fill-level, which is predetermined by the structure of the probe unit 5 and its position within, or on, the container 2, then an electrical contact is produced between the sensor electrode 6 and the wall of the container 2, which leads, for example, to a change in the electrical current, which can be sensed from the sensor electrode 6. A problem arises, when, for example, the medium 1 again sinks and, in such case, medium 1 remains clinging to the probe unit 5 as accretion. If, for example, the entire wall of the container 2 is electrically conductively connected with ground and the accretion of the sensor electrode 6 extends to the wall, then an erroneous reading is presented on the display, since then always the still-immersed state is displayed. In order to avoid this problem of accretion, a so-called guard electrode 7 is provided, which preferably surrounds the sensor electrode 6 coaxially at least in the range, in which the sensor electrode comes in contact with the medium 1 (this is true also for the measuring device embodied according to the invention). Between the sensor electrode 6 and the guard electrode 7, usually an insulator is provided in the probe unit 5. This guard electrode 7 is here supplied, via a first amplifying unit 9, with a guard signal GS. In such case, the activating signal AS and the guard signal GS have preferably essentially the same phase and the same amplitude. If accretion forms on the probe unit 5, then the guard electrode 7 drives an alternating electrical current to the counter-electrode (this is here, for example, the grounded wall of the container 2, or, in an alternative embodiment, a second, additional electrode) and lifts the electrode-covering accretion to the guard potential. An electrical current flow from the probe electrode 6 to the counter-electrode 2 is, thus, prevented and a "free" signal is produced, thus indicating that the sensor electrode 6 is not immersed in the medium. A problem is, however, in the state of the art, usually, that the amplifying unit 9, because of its internal resistance, can only deliver limited electrical current and, thus, in the case of conductive accretions, the guard potential cannot be maintained. An electrical current flow from the probe electrode 6 to the counter-electrode 2 (here, the wall) is the result and an "immersed" signal is produced.

Figure 2:
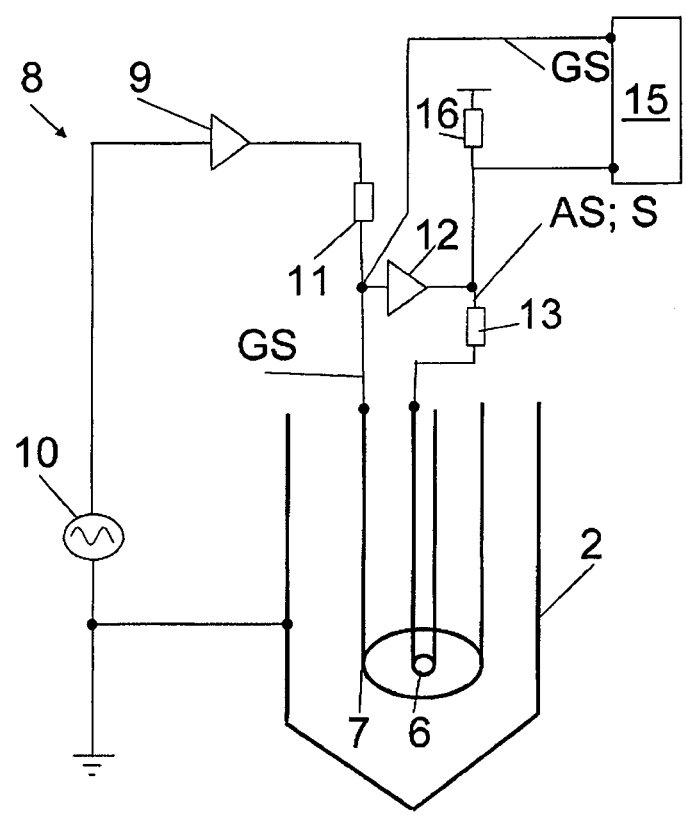
FIG. 2 a schematic drawing of a measuring device of the invention.

This problem is overcome by a measuring device of the invention, such as illustrated in FIG. 2. Again, only the components of electronics unit 8 essential for the explanation of function are shown. The signal of the signal source 10 is supplied here from the amplifying unit 9 via a limiting element 11 to the guard electrode 7. The limiting element 11 is, in such case, in the embodiment shown here, an ohmic resistor. By way of example, amplifying unit 9 has an internal resistance between 50 and 200Ω. The resistance of the limiting element 11 is selected larger than the internal resistance of the amplifying unit 9. Through the limiting element 11, it is prevented, that the amplifier 9 comes into the limiting state. The guard signal GS is fed to the evaluating unit 15 for evaluation or determining of the fill level. The guard signal GS is, for example, digitized in evaluating unit 15 by an analog-digital converter, which, on occasion, is also a part of a microprocessor. Furthermore, the guard signal GS is fed to an amplifying unit in the form of isolating unit 12, which here serves to isolate the circuit portions from one another. The amplification of isolating unit 12 is set, for example, equal to one. The guard signal GS reaches then via the probe electrical current limiting element 13 the sensor electrode 6 as activating signal AS. The probe electrical current limiting element 13 is, in such case, preferably also an ohmic resistor, which prevents, that the probe electrical current in the case of very conductive media becomes too large and therewith, for example, lies outside of the range of the analog/digital converter. The activating signal AS is, here, also fed to the evaluating unit 15, in order, for example, that it, likewise, can be digitized. If the guard signal GS and the activating signal AS do not differ, because, for example, the isolating unit 12 has an amplification of one and also otherwise provides no changes to the guard signal GS, then it is sufficient, when only one of the two voltage signals GS or AS is transferred to the evaluating unit 15. In the evaluation, in one embodiment, the ratio between the guard signal GS or the activating signal AS, as reference signal, and the electrical current signal S or a voltage proportional thereto is evaluated, or the probe impedance is determined and processed. In the case of increasing load on the guard electrode 7, indeed, the measurement voltage is reduced on the sensor electrode 6, however, limit levels or accretions down to almost 0Ω can be safely detected. Moreover, digitizing permits also an exact phase determination, so that also conductive or capacitive measurements can be performed. Thus, either the real or imaginary part can be determined. The two values permit determining of fill level, or the reaching, or subceeding, or falling beneath, of a predetermined fill level.

Figure 3:
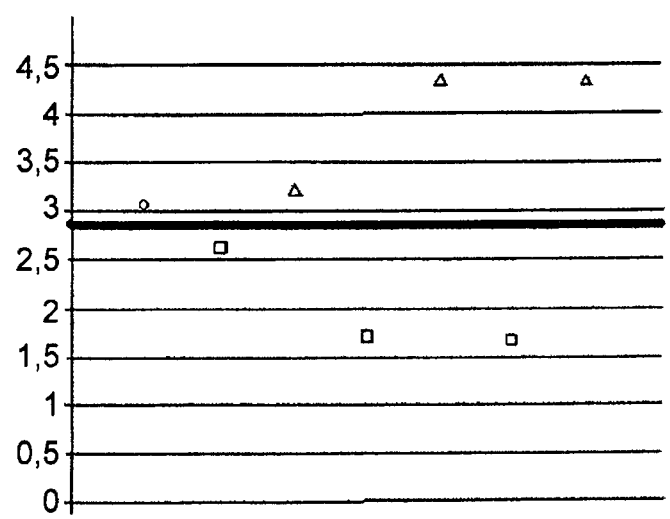
FIG. 3 a graphical drawing of amplitude ratios of signals in the measuring of different media.

Shown in FIG. 3 are different ratios between the reference signal GS and a voltage proportional to probe electrical current S. The measurements refer, in such case, from left to right, to air, immersion in water, water accretion without immersion, immersion in shampoo, shampoo accretion without immersion, immersion in mustard and mustard accretion without immersion.

The switching threshold is shown as a thicker line at a ratio of 2.85. The three lower measurement points (square symbols) show, in each case, the ratio of the values, when the sensor element is covered by a certain accretion. The three upper triangular measurement points show the situation, when the medium has reached the predetermined fill-level and the sensor electrode is immersed. If one compares, in each case, the points associated with one another (i.e., in each case, water, or, in each case, shampoo), then it is evident, that the distance between the points is always sufficiently large, so that a switching threshold can be comfortably given, whose exceeding leads to a display of the reaching of the predetermined fill level. Conversely, also the subceeding, or falling beneath, of a predetermined fill level can be sufficiently well recognized, especially also in the presence of accretion.

The invention claimed is:

1. An apparatus for determining and/or monitoring at least one process variable of a medium in a container, comprising:
   at least one probe unit, which has at least one sensor electrode and a guard electrode;
   at least one electronics unit, which supplies said at least one sensor electrode with an activating signal and which supplies said guard electrode with a guard signal;
   at least one amplifying unit; and
   at least one limiting element, which is arranged in series between said guard electrode and the output of said at least one amplifying unit;
   at least one evaluating unit, which determines and/or monitors the process variable based on an electrical current signal measurable at said at least one sensor electrode and said activating signal and/or said guard signal, wherein:
   said at least one amplifying unit supplies via said at least one limiting element said guard electrode with said guard signal; and
   said at least one amplifying unit supplies via said at least one limiting element said at least one sensor electrode with said activating signal.

2. The apparatus as claimed in claim 1, wherein:
   said at least one amplifying unit has an amplification factor which is essentially constant over time.

3. The apparatus as claimed in claim 1, further comprising:
   at least one measuring resistor, via which said electrical current signal is measured.

4. The apparatus as claimed in claim 1, further comprising:
   at least one isolating unit, whose input is electrically connected with said at least one limiting element and whose output is electrically connected with said at least one sensor electrode, wherein:
   said at least one isolating unit is embodied in such a manner, it essentially prevents an electrical circuit, which is connected with its output from affecting an electrical circuit, which is connected with its input.

5. The apparatus as claimed in claim 4, wherein:
   said at least one isolating unit is an amplifying unit.

6. The apparatus as claimed in claim 1, further comprising:
   at least one probe electrical current limiting element, which is arranged between said at least one sensor electrode and the output of said at least one isolating unit and which limits electrical current flowing via said at least one sensor electrode.

7. The apparatus as claimed in claim 1, wherein:
   the container is at least partially embodied as a ground electrode.

8. The apparatus as claimed in claim 6, wherein:
   said at least one limiting element is an ohmic resistor; and/or said at least one probe electrical current limiting element is an ohmic resistor.

9. The apparatus as claimed in claim 1, further comprising:
   at least one signal source, which is connected with the input of said at least one amplifying unit.

10. The apparatus as claimed in claim 1, wherein:
    said guard signal and said activating signal are electrical, alternating voltages.

11. The apparatus as claimed in claim 1, wherein:
    said at least one evaluating unit is embodied in such a manner, that it digitizes at least said guard signal and/or said activating signal.

12. The apparatus as claimed in claim 1, wherein:
    said at least one evaluating unit is embodied in such a manner, that it ascertains at least one amplitude ratio of said guard signal and/or said activating signal and the electrical current signal and/or an electrical voltage signal dependent therefrom; and
    said at least one evaluating unit determines and/or monitors the process variable on the basis of the amplitude ratio.

13. The apparatus as claimed in claim 1, wherein:
    the process variable is the fill-level of the medium.

* * * * *